June 20, 1939. W. VOIT 2,163,313
FUEL INJECTION PUMP
Filed Oct. 9, 1936
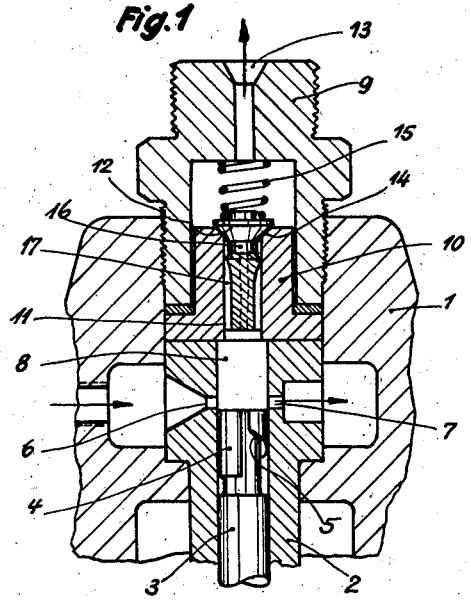
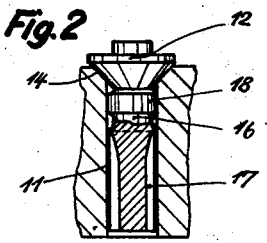
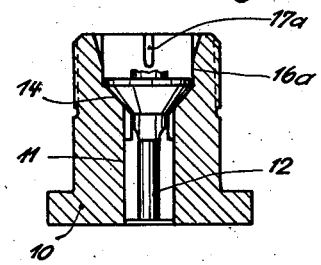
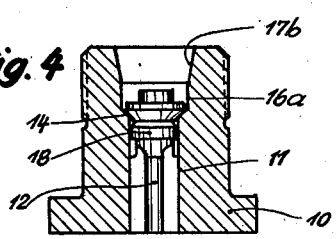
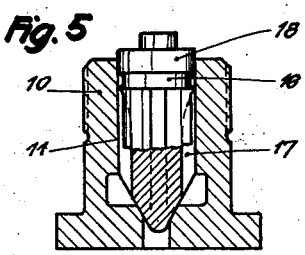
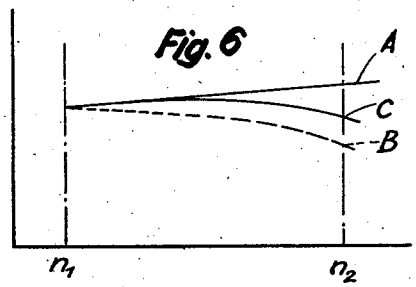
Inventor
Willy Voit
by Roy F. Stewart
his attorney Patented June 20, 1939

2,163,313

UNITED STATES PATENT OFFICE 2,163,313

FUEL INJECTION PUMP

Willy Voit, Stuttgart-Bad Cannstatt, Germany, assignor to Robert Bosch Gesellschaft mit beschränkter Haftung Application October 9, 1936, Serial No. 104,874
In Germany October 17, 1935

6 Claims. (Cl. 103—41)

The invention relates to improvements in fuel injection pumps, having a piston-valve controlled suction passage and a controlling member moved by the liquid pressure in the fuel discharge outlet against a spring pressure, in which the delivery characteristic of the pump, which rises with the speed, in spite of the adjustment of the governing members remaining constant, is automatically adapted to the consumption characteristic of the engine, which falls as the speed increases, in order to obtain the best output over the whole speed range of the engine.

An object of the invention is to adapt the maximum fuel amount passing to the nozzle to the consumption characteristic of the engine over the whole range of speeds even in the case of supercharged and other special engines.

Certain engines have a consumption characteristic which does not constantly decline from the lower speed range up to the maximum speed, but in which the consumption curve remains the same or rises in the lower speed range up to the region of medium speeds, and then falls only on a further rise in speed. For instance, a supercharged engine may have such a consumption curve, which because the degree of delivery of the blast is poor at low speed, increases to a maximum value up to medium speeds, and then remains the same or falls.

In order now even for such engines to bring the curves of the delivery amount of the pump and the degree of consumption of the engine as far as possible into accord, the controlling valve of an injection pump is constructed according to this invention so that the cross-section of the passage opened for the flow of fuel, which the controlling valve or member controls in co-operation with a controlling edge, in the course of the full opening stroke of said valve is very small for a considerable initial part of the total opening valve stroke and then for a further and also large part of the opening valve stroke this passage gradually extends in area until the maximum cross-sectional area is attained.

Several examples of construction of the invention are shown in the accompanying drawing, in which:—

Figure 1 is a fragmentary longitudinal section through a fuel injection pump.

Figures 2–5 show various constructions of the controlling member.

Figure 6 shows various curves in the course of the injection in dependence on the speed.

On the casing 1 of an injection pump a pump piston 3 is arranged in the cylinder 2, and in known manner has at its delivery end a controlling surface 4, which is bounded by an edge 5 running obliquely to the axis of the piston, and works in conjunction with a suction passage 6 and a return flow passage 7. The pressure chamber 8 in the cylinder 2 is bounded in the direction of the piston axis by a casing 10 pressed on the cylinder 2 by means of a threaded nipple 9, and in the longitudinal bore 11 of the casing a controlling member 12, formed at the same time as a pressure valve, is arranged. From the threaded nipple 9 the pressure pipe 13 leads to the injection nozzle (not shown). The controlling member 12 is provided with a conical seating surface 14, with which the controlling member loaded by a spring 15 is pressed against a complementary seating surface provided on the casing 10.

The abscissa $n_1$ in Figure 6 denotes the lowest working speed of about 400 revolutions per minute, while the reference letter $n_2$ denotes the maximum working speed of about 2000 revolutions per minute. Owing to the increased gap action at high speeds, piston valve controlled injection pumps show, at every governing position, especially also when adjusted for the full load amount, a delivery course increasing with the speed in accordance with the curve A. This course does not always correspond to the course of the consumption curve of many engines, but deviates considerably therefrom. By a suitable reduction of the passage cross sections of the controlling member, a declining curve B, which coincides with the consumption curve of many engines, may be obtained. Other engines, especially those having scavenging or charging blasts, can however burn or consume without smoke a maximum fuel amount at first increasing with the speed but then again decreasing, so that a combustion curve results in accordance with curve C in Figure 6, which must be adapted to the delivery curve of the pump if it is desired to get from the engine at every speed the best possible output with a running still free from smoke. In order to be able to obtain this curve, according to the invention a constriction 16 is provided on the controlling member which is situated between the conical surface 14, and the controlling surfaces 17, and is followed by the greatest contracted part of these controlling surfaces 17.

The mode of working of this arrangement is as follows:

The controlling member 12 opens the passage cross-section only slightly on a small lift, and only on a greater lift do the controlling surfaces 17 open a somewhat larger but still restricted section for the passage of the fuel. For this reason the controlling member at great delivery speeds emerges more from the bore 11 of the casing 10 than at small delivery speeds and engine speeds. Owing to the difference in pressure which occurs on opening the return flow passage 7, the controlling member begins its return movement after the end of the delivery stroke of the piston, in which movement the passage cross-section, which is at first wide, increasingly narrows until the greatest point of contraction on the closing control edge formed by the casing 10 is passed. From that moment, the very restricted cross-section for the return flow remains the same during the rest of the closing operation.

As at high speeds of revolution and speed of fuel supply, the valve body moves over a larger opening stroke than at medium or lower speeds of revolution of the engine, the return path and the speed of closure of the control body is increased, as the absolute time of closing remains independent of the stroke length and is always constant. In view of the throttling in the fluid conveying passage, the closing operation of the valve body at high speeds will cause an increased degree of reduction of pressure or relief in the space between the nozzle opening and the valve than at lower speeds. The injection at the next supply time can only begin if the pressure in the space between nozzle and valve is again raised to the opening pressure of the nozzle. In order to secure this, a certain proportion of the fuel supply charge is essential depending on the amount of the previous charge. The volume injected is reduced by such amount. At higher speeds of delivery, the relief, and in consequence the proportion by which the injected charge is reduced, is greater than at medium or low delivery speeds.

On the delivery stroke, the intermediate part between the conical seating surface and the greatest contraction of the controlling surface further acts to increase the lift of the controlling member at high speeds, as the greatest contracted part in spite of the enlargement situated between it and the conical face does not allow more fuel to pass than corresponds to its cross-section and only opens a larger cross-section when it has moved past the controlling edge. The consequence of this is, that a lift increased by the intermediate piece, and a relief effect increased substantially corresponding to this lift occurs and therefore, the amount of fuel to refill the pipe up to the injection pressure is larger as compared with the preceding lift at high speeds than would be the case for a valve body unprovided with this intermediate piece.

As in the region of low speeds the lift of the controlling member is small and the point of the greatest contraction is distant from the closing part, the intermediate piece and the point of greatest contraction will in this case always remain in connection with the controlling edge; thus no greater cross-sectional enlargement can thus occur for a considerable range of lift, as the point of greatest contraction controls the passage for the fuel. In the region of low speeds the relief effect can, in this case, only occur to a small extent during the closing stroke of the controlling member, so that in this region the delivery curve runs upward. By means of the arrangement according to the invention a rising delivery curve can thus be obtained at low speeds, and at high speeds a falling delivery curve the course of which is well adapted to the consumption characteristic of an engine.

Figure 2 shows another form of construction of a controlling member which acts at the same time as a pressure valve. This controlling member 12, provided in known manner with a small plunger 18, increases in the residual part of its closing stroke the capacity of the chambers leading to the nozzle by its own capacity. First, the constriction 16 follows the plunger 18, and then the part of the controlling member 12 provided with the guide surfaces 17.

Figures 3 and 4 show the arrangement of the controlling surfaces 17a in the casing 10. The head terminating the conical seat 14 of the normal controlling member 12 serves in this construction as a controlling edge. The constriction 16a is arranged in the casing 10 between the guide surfaces 17a and the conical seat. The controlling member in Figure 4 is provided in known manner with a small plunger 18. The controlling surface 17b in the casing 10 is made as an open obtuse cone, in contrast to the triangular or rectangular form of the controlling grooves 17 and 17a of the preceding examples.

In Figure 5, the conical seat of the controlling member 12 also formed as a pressure valve is arranged at the opposite end to that loaded by the compression spring 15. The constriction 16 is situated, here also, between the small plunger 18 and the controlling surfaces 17.

I declare that what I claim is:

1. A fuel injection pump for supplying fuel to engines, comprising a cylinder, a reciprocable piston mounted therein, a discharge valve, a pressure conduit behind said valve, means for releasing an adjustable amount of the fuel displaced by said piston at its pressure stroke, and a guide seating for said discharge valve, said valve and guide seating having cooperating controlling surfaces to provide a passage in said guide seating for flow of fuel from said cylinder to said pressure conduit and a closure for said passage, a portion of said passage being of unchanging cross-sectional area and a portion being of gradually increasing cross-sectional area whereby, on the opening stroke of said valve, for a considerable initial part of the total opening stroke said valve opens a throttling passage of very small but unchanging cross-sectional area for flow of fuel and then for a further and also large part of its opening stroke said valve opens a passage for flow of fuel which gradually increases in cross-sectional area until the maximum cross-sectional area is reached.

2. A fuel injection pump for supplying fuel to engines, comprising a cylinder, a reciprocable piston mounted therein, a discharge valve, a pressure conduit behind said valve, means for releasing an adjustable amount of the fuel displaced by said piston at its pressure stroke, and a guide seating for said discharge valve and provided with a passage for flow of fuel from said cylinder to said pressure conduit, said discharge valve having a closure portion and a control portion, said closure portion being adapted to cooperate with said guide seating to close said passage in the closed position of said valve and said control portion being adapted to control the cross-sectional area of said passage in the open position of said valve, said control portion having a part of reduced but unchanging cross-section intermediate the ends of said valve and a part which decreases in cross-section from said intermediate part toward one end of said valve and in the direction of closing movement thereof.

3. A fuel injection pump for supplying fuel to engines, comprising a cylinder, a reciprocable piston mounted therein, a discharge valve, a pressure conduit behind said valve, means for releasing an adjustable amount of the fuel displaced by said piston at its pressure stroke, and a guide seating for said discharge valve and provided with a passage for flow of fuel from said cylinder to said pressure conduit, said discharge valve having a closure portion at one end thereof and a control portion between said closure portion and the other end of said valve, said closure portion being adapted to cooperate with said guide seating to close said passage in the closed position of said valve and said control portion being adapted to control the cross-sectional area of said passage in the open position of said valve, said control portion having a part of reduced but unchanging cross-section adjacent said closure portion and intermediate the ends of said valve and a part which decreases in cross-section from said intermediate portion toward the end of said valve remote from said closure portion.

4. A fuel injection pump for supplying fuel to engines, comprising a cylinder, a reciprocable piston mounted therein, a discharge valve, a pressure conduit behind said valve, means for releasing an adjustable amount of the fuel displaced by said piston at its pressure stroke, and a guide seating for said discharge valve and provided with a passage for flow of fuel from said cylinder to said pressure conduit, said discharge valve having a closure part, a piston part completely filling said passage, a control part of varying contour, and an intermediate constricted part between said control part and said piston, said closure part being adapted to cooperate with said guide seating to close said passage in the closed position of said valve and said control part being adapted to control the cross-sectional area of said passage in the open position of said valve.

5. A fuel injection pump for supplying fuel to engines, comprising a cylinder, a reciprocable piston mounted therein, a discharge valve, a pressure conduit behind said valve, means for releasing an adjustable amount of the fuel displaced by said piston at its pressure stroke, and a guide seating for said discharge valve and provided with a passage for flow of fuel from said cylinder to said pressure conduit, a portion of said passage being of unchanging cross-sectional area and a portion being of increasing cross-sectional area in the direction of opening movement of said valve, said discharge valve having a closure portion in said passage, said closure portion having a peripheral edge spaced from the portion of said passage of unchanging cross-sectional area, said closure portion of said valve being movable in the aforesaid portions of said passage and adapted to cooperate with said guide seating to close said passage in the closed position of said valve and to cooperate with the aforesaid portions of said passage to control the effective cross-sectional area of said passage in the open position of said valve.

6. A fuel injection pump for supplying fuel to engines, comprising a cylinder, a reciprocable piston mounted therein, a discharge valve, a pressure conduit behind said valve, means for releasing an adjustable amount of the fuel displaced by said piston at its pressure stroke, and a guide seating for said discharge valve and provided with a passage having a portion of varying cross-sectional area and a portion of unvarying cross-sectional area for flow of fuel from said cylinder to said pressure conduit, said discharge valve having a closure portion movable in the aforesaid portions of said passage and adapted to cooperate with said guide seating to close said passage in the closed position of said valve and to control the effective cross-sectional area of said passage in the open position of said valve, said valve opening a throttling passage of very small but unchanging cross-sectional area immediately after beginning its opening stroke and for a considerable part of said stroke and then for a further and also large part of its opening stroke opening a passage for flow of fuel which gradually increases in cross-sectional area until the maximum cross-sectional area is reached.

WILLY VOIT.